E. MARSHALL.
Corn-Planter.

No. 10,753.

Patented Apr. 11. 1854.

UNITED STATES PATENT OFFICE.

ELBRIDGE MARSHALL, OF CLINTON, NEW JERSEY.

IMPROVEMENT IN SEED-PLANTERS.

Specification forming part of Letters Patent No. 10,753, dated April 11, 1854.

*To all whom it may concern:*

Be it known that I, ELBRIDGE MARSHALL, of Clinton, in the county of Hunterdon and State of New Jersey, have invented a new and Improved Machine for Planting Corn and other Seeds; and I do hereby declare that the following is a full, clear, and exact description of the construction and operation of the same, reference being had to the annexed drawings, making a part of this specification, in which—

Figure 1:
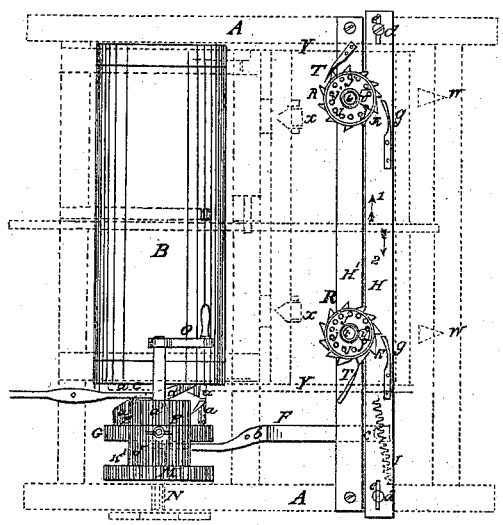
Figure 2:
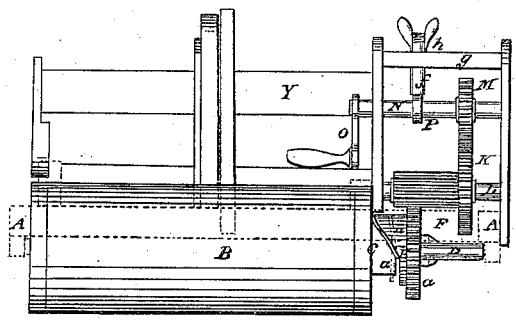
Figure 3:
Figure 4:
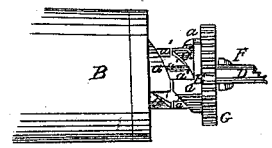
Figure 5:
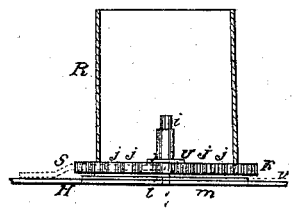

Figure 1 is a plan or top view of my improved machine, the frame being shown by red and the working parts by black lines. Fig. 2 is a back view of the same in elevation, that portion of the frame which would conceal any of the working parts being shown by red lines. Fig. 3 is a face view of one of the two cams by which the distributing device is operated. Fig. 4 is a view of the two cams above mentioned, showing their operation. Fig. 5 is a vertical section of one of the hoppers in which the corn or seed to be planted is placed.

Similar letters of reference indicate corresponding parts in the several figures.

This invention relates to certain new and useful improvements in machines for planting corn and other seeds which are planted in hills or are required to be dropped at certain intervals.

The nature of the invention consists, first, in operating the distributing device by means of two cams having two sets or rows of inclined planes placed on concentric circles, for the purpose of causing one of the cams to be operated evenly in a direction always perfectly longitudinal with the shaft on which it is placed, and thereby preventing any unnecessary friction or binding of said cam upon its shaft. The cam above mentioned is connected with gearing by which, upon applying the hand to a crank, the gearing will be operated and said cam turned on the shaft, so as to cause the seed to be dropped at greater intervals.

My invention consists, second, in a peculiar arrangement of the distributing device, by which the seed is dropped with certainty at the proper times, and the apertures in the bottoms of the hoppers and plates prevented from being clogged or choked with the seed.

To enable others skilled in the art to make and use my invention, I will proceed to describe its construction and operation.

A, Figs. 1 and 2, represents the frame of the machine, said frame being of rectangular form, and having a roller, B, at its back end.

On one end of the roller B there is attached a cam, C, which is a circular disk, having upon its face two rows or sets of inclined planes, $a$ $a'$. The inner row or set, $a'$, of inclined planes is placed on a circle concentric with the circle on which the outer row or set, $a$, are placed. (See Fig. 3.) In the drawings two inclined planes are represented on each circle, there being four in all. The inclined planes are so placed upon the face of the cam as to be at opposite points. For instance, the inclined planes $a$ $a$ are at opposite points to each other on the same circle, and the inner inclined planes, $a'$ $a'$, are similarly placed upon their circles, and each of the two pairs of cams $a$ $a$ $a'$ $a'$ are oppositely placed to each other. This will be clearly understood by referring to Fig. 3.

D is a shaft on which the roller B is hung. Upon this shaft B there is placed loosely a cam, E, constructed precisely similar to the cam C, the inclined planes of each cam facing each other, as shown in Fig. 4.

F is a lever having its fulcrum at $b$. One end of this lever is forked and fits over the shaft D, and bears against the outer side of a toothed wheel, G, which is secured to the outer side of the cam E. (See Figs. 1, 2, and 4.) The opposite end of the lever F is attached by a pivot, $c$, (seen in dotted lines, Fig. 1,) to a vibrating bar, H, which is placed transversely on the frame A, said bar H being made to work in proper position by means of screws or pivots $d$ $d$, one at each end of the bar, the screws or pivots passing through oblong slots $e$ $e$ in the bar H and into the frame A, as shown in Fig. 1.

I, Fig. 1, is a spiral spring, one end of which is secured to the frame A and the opposite end to the vibrating bar H.

J is a pinion which gears into the toothed wheel G, which is attached to the cam E. This pinion is permanently secured to a toothed wheel, K, which, with the pinion J, is hung on a shaft, L, above the shaft D of the roller. The toothed wheel K gears into a pinion, M, which is hung upon a shaft, N, above the shaft L. The shaft N has a crank, O, at one end, also has a band or ring, P, around it provided with a shank, $f$, which passes up through a cross-piece, $g$, of the frame, and has a nut, $h$, upon it. The position of the wheels and pinions above mentioned is more particularly shown in Fig. 2.

R R, Fig. 1, are two hoppers, which work on upright pins $i\ i$ on a stationary bar, H', adjoining the bar H. The hoppers are provided with bottoms perforated with holes $j$ in the form of a circle, as shown in Fig. 1, and the bottoms of the hoppers have teeth cut in them on their outer edges, so as to form ratchets $k\ k$. (See Fig. 1.)

S S are pawls secured to the bar H, said pawls catching into the teeth of the ratchets $k\ k$.

T T are retaining-pawls secured upon the stationary bar H', and acting against the teeth of the ratchets $k\ k$.

U U are metal plates which fit over one or two of the holes $j$ in the bottoms of the hoppers R R. There is one plate in each hopper. (See Figs. 1 and 5.)

V, Fig. 5, is a stationary circular plate perforated with a hole, $l$, at points directly underneath the plates U U. There is a plate V underneath each hopper. The bar H is also perforated with holes $m$, one working underneath each hopper.

W W are furrow-shares directly in front of the hoppers R R, one to each hopper, and directly behind each hopper R there is a covering-share, X. Both the furrow and covering shares are attached to a movable frame, Y, on the upper part of the frame A.

Operation: As the machine is drawn along, the cam C, which is attached to the roller B, will force outward the cam E upon the shaft D, in consequence of the inclined planes $a\ a'$ on the faces of both the cams, and the cam E will be forced outward upon the shaft D evenly, because there will be an equal pressure upon the cam E all around the shaft D, owing to the inclined planes being placed oppositely to each other, as previously explained. As the cam E is forced outward upon the shaft D, the forked end of the lever F is also moved outward, and the bar H is moved in the direction of arrow 1, (see Fig. 1,) and when the prominent parts of the inclined planes on the two cams have passed each other the bar H is brought back to its original position (see arrow 2) by the spiral spring I, and the cam E forced closely into the cam C, as shown in Fig. 2. As the bar H is moved in the direction of arrow 1, the pawls S S move the hoppers R R around the distance of one tooth, and one of the holes $j$ in each hopper passes under the plates U U, and when said holes $j$ come over the hole $l$ in the circular plate V underneath the hopper the seed will drop into the hole $l$, but cannot pass through the hole $m$ in the bar H, because that is not in line with the holes $j\ l$, when the bar is moved forward in the direction of arrow 1, (see Fig. 5,) the black dotted lines representing the hole $m$ in the bar H, when the bar is moved in the direction of arrow 1; but when the bar H returns to its original position, the hole $m$ is then in line with the holes $j\ l$, and the seed falls through the hole $m$ into the furrow. Both hoppers are precisely similar in construction and operation. By having the vibrating bar H underneath the hoppers the holes $j\ l\ m$ are prevented from choking or clogging, the bar H serving to agitate the seed and loosen it in the holes, so that it will drop freely from them.

The space between the hills in one direction is equal to the distance between the two hoppers R R, and the spaces in the other direction is owing to the size of the cams C E and the number of inclined planes on their surfaces. The latter space, however, may be varied more or less by operating the crank O, by which the cam E is turned upon the shaft D. By referring to Fig. 4 it will be seen that the most prominent parts of the inclined planes of the two cams are in contact, and when the roller has moved but a trifle farther the prominent parts will pass each other, and the cam E will be forced into the cam C, and the seed will drop from the hoppers R R, the several holes $j\ l\ m$ then being in line. Now, in order to prevent this and increase the spaces, the cam E is turned upon the shaft D, and the points $o'$ of the inclined planes $a\ a$ thrown back so as to be opposite points $o'\ o'$ on the inclined planes of the cam C; or, in other words, by turning the cam E a certain distance backward, or in a contrary direction to that in which it moves when the machine is drawn along, the space between the hills will be increased, because more time elapses between the vibrations of the lever F.

It must be understood that the seed will always be dropped the same distance apart, as the lateral movement of the cam E is constant or unchangeable unless the hand is applied to the crank O. This is only done in certain cases—for instance, in avoiding rocks, stumps, or other places where it would be useless to drop the seed, but desirable to have it dropped immediately at the side in order to economize in ground.

In planting corn the ground is previously furrowed in one direction, and the machine is drawn along at right angles to the furrows previously made, and the seed dropped in them.

The cam E is attached to the toothed wheel G, and both the cam and toothed wheel are placed loosely on the shaft D. The cam C as it rotates does not turn the cam E, but moves it laterally outward on the shaft D, in consequence of the inclined planes $a\ a'$, and the lever F is also moved and operates the bar H. The toothed wheel G, by being connected with the gearing J K M, may be moved or turned backward on the shaft D, so that the inclined planes cannot pass each other at the usual time, and consequently the movement of the bar H will be retarded and the seed will be dropped from the hoppers at greater intervals.

I do not claim the rotating hoppers with perforated bottoms; neither do I claim any peculiarity in the furrow and covering shares, nor the movable frame to which they are attached; nor do I claim the cams C E irrespective of their peculiar construction; but

What I claim as new, and desire to secure by Letters Patent, is—

1. The cams C E, having two rows or sets of inclined planes, $a\,a'$, upon their faces, said inclined planes being placed oppositely on concentric circles for the purpose of creating an equal pressure upon the cam E, and connecting said cam E with suitable gearing, substantially as shown, whereby its position upon the shaft D may be changed and the seed dropped at a greater or less distance apart whenever the crank O is operated or turned by the hand, as herein shown and described.

2. The bar H, performing, in combination with the circular plates V underneath the hoppers U, the office of a valve, and simultaneously rotating said hoppers by its vibrating motion, the above parts being arranged and operating substantially as described.

ELBRIDGE MARSHALL.

Witnesses:
  JACOB P. FINLEY,
  NATHAN GEARHART.